（12）United States Patent
Adler et al.

(10) Patent No.: US 11,987,228 B2
(45) Date of Patent: May 21, 2024

(54) BRAKE SYSTEM FOR A VEHICLE, VEHICLE AND METHOD OF CONTROLLING A BRAKE SYSTEM FOR A VEHICLE (71) Applicant: KNORR-BREMSE Systeme fuer Nutzfahrzeuge GmbH, Munich (DE)

(72) Inventors: Tamas Adler, Erd (HU); Kornel Straub, Pomáz (HU); Huba Nemeth, Budapest (HU); Csaba Horvath, Biatorbagy (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 646 days.

(21) Appl. No.: 17/273,043

(22) PCT Filed: Sep. 3, 2019

(86) PCT No.: PCT/EP2019/073457
§ 371 (c)(1),
(2) Date: Mar. 3, 2021

(87) PCT Pub. No.: WO2020/057964
PCT Pub. Date: Mar. 26, 2020

(65) Prior Publication Data
US 2021/0323522 A1 Oct. 21, 2021

(30) Foreign Application Priority Data
Sep. 18, 2018 (EP) .................... 18195182

(51) Int. Cl.
*B60T 8/94* (2006.01)
*B60T 7/02* (2006.01)
(Continued)

(52) U.S. Cl.
CPC .................... *B60T 8/94* (2013.01); *B60T 7/02* (2013.01); *B60T 8/17* (2013.01); *B60T 8/1701* (2013.01);
(Continued)

(58) Field of Classification Search
CPC .... B60T 2270/402; B60T 13/683; B60T 8/94; B60T 2270/413; B60T 2270/10;
(Continued)

(56) References Cited

U.S. PATENT DOCUMENTS

2008/0309154 A1* 12/2008 Hilberer ............... B60T 13/683
303/15
2016/0068144 A1* 3/2016 Hummel ............... B60T 8/1708
701/78
2019/0241164 A1* 8/2019 Nemeth ............... B60T 13/662

FOREIGN PATENT DOCUMENTS

CN 1522213 A 8/2004
CN 101918258 A 12/2010
(Continued)

OTHER PUBLICATIONS

WO 2018046247 A1 (Year: 2018).*
(Continued)

*Primary Examiner* — Robert A. Siconolfi
*Assistant Examiner* — Mahbubur Rashid
(74) *Attorney, Agent, or Firm* — NORTON ROSE FULBRIGHT US LLP; Gerard A. Messina (57) ABSTRACT A brake system for a vehicle includes a first axle-pressure-modulator (APM) for service-brake-chambers associated with a first vehicle-axle, a second APM for spring-brake-cylinders associated with a second vehicle-axle, wherein the second APM is connected to an electronic-brake-control-unit configured to issue a first electric-control-signal for controlling the first APM and a second electric-control-signal for controlling the second APM, a further electronic-
(Continued)

brake-control-unit configured to issue a further first electric-control-signal for controlling the first APM and a further second electric-control-signal for controlling the second APM, an electronic-parking-brake-controller configured to issue a second pneumatic-control-signal for controlling the spring-brake-cylinders, and a pressure-modulator-unit configured to convert a pneumatic signal or an electric signal issued by the electronic-parking-brake-controller into a first pneumatic-control-signal for controlling the first APM.

25 Claims, 4 Drawing Sheets

(51) Int. Cl.
*B60T 8/17* (2006.01)
*B60T 13/58* (2006.01)
*B60T 13/68* (2006.01)

(52) U.S. Cl.
CPC .......... *B60T 13/581* (2013.01); *B60T 13/683* (2013.01); *B60T 13/686* (2013.01); *B60T 2270/10* (2013.01); *B60T 2270/402* (2013.01); *B60T 2270/403* (2013.01); *B60T 2270/413* (2013.01)

(58) Field of Classification Search
CPC .... B60T 2270/403; B60T 8/17; B60T 13/686; B60T 8/1701; B60T 13/581; B60T 15/027; B60T 7/02
See application file for complete search history.

(56) References Cited

FOREIGN PATENT DOCUMENTS

| | | |
|---|---|---|
| CN | 103419765 A | 12/2013 |
| CN | 105408178 A | 3/2016 |
| CN | 108202726 A | 6/2018 |
| DE | 102008009043 B3 | 5/2009 |
| EP | 2794368 B1 | 11/2015 |
| WO | 2004098967 A2 | 11/2004 |
| WO | 2005082694 A1 | 9/2005 |
| WO | 2007079946 A1 | 7/2007 |
| WO | 2009086855 A1 | 7/2009 |
| WO | WO-2018172233 A1 * | 9/2018 .............. B60T 13/66 |

OTHER PUBLICATIONS

WO 2004098967 A2 (Year: 2004).*
International Search Report for PCT/EP2019/073457, Issued Nov. 11, 2019.

* cited by examiner

BRAKE SYSTEM FOR A VEHICLE, VEHICLE AND METHOD OF CONTROLLING A BRAKE SYSTEM FOR A VEHICLE

FIELD OF THE INVENTION

The present invention relates to a brake system for a vehicle, to a vehicle with the brake system, and to a method of controlling a brake system for a vehicle.

BACKGROUND INFORMATION

Autonomous or near-autonomous operation of transport vehicles is a relatively new field of technology. More sophisticated functions require special hardware infrastructure. For example, present commercial vehicle systems require the presence and attention of a driver. However, in the future the driver will be less involved in the driving control task of the vehicle, and automated systems are supposed to take over more significant driving functions, which requires increased reliability levels and consequently different types of system redundancies.

Commercial vehicles conventionally use electro-pneumatic or by-wire brake systems, wherein the electronic part of the control is realized as a single-circuit control. In case of malfunction of the control electronics, the driver is able to control the pneumatic part of the brake system by their foot because a two-circuit pneumatic backup system still is available. In case of highly automated vehicles where the driver is not in the control loop anymore, or even not available or present in the vehicle, the above brake system would be unsatisfactory, since there is no arrangement/structure which would substitute the brake control by the driver in case of malfunction of the single electronic control circuit. Therefore some redundancy is to be added to the control of a brake system.

Patent document DE 10 2008 009 043 B3 discusses a redundant brake system for a commercial vehicle. The system utilizes a parking brake integrated into an air supply unit as a redundant brake actuator. For axles not equipped with spring parking brake chambers, a control output of a trailer control module is used as pneumatic control input of axle modulators.

Patent document EP 2 794 368 B1 discusses a redundant brake system for a commercial vehicle. The system utilizes the parking brake integrated into an air supply unit as a redundant brake actuator. For axles not equipped with spring parking brake chambers the air supply unit includes an additional electro-pneumatic modulator to generate control pressure for the pneumatic control input of the axle modulators.

SUMMARY OF THE INVENTION

Against this background, it is an object of the present invention to provide an improved brake system for a vehicle, an improved vehicle with the brake system, and an improved method of controlling a brake system for a vehicle.

This object may be achieved by a brake system for a vehicle, by a vehicle with the brake system, and by a method of controlling a brake system for a vehicle according to the main claims.

According to embodiments, for example, there may be provided a solution for a multiple redundant brake architecture where rEPM (rEPM=redundant electronic pressure modulator) and rEPBi (rEPB=redundant electronic parking brake) architectures are combined to provide two additional control circuits. The system may comprise a brake system with three independent electric brake control circuits, which can be necessary for autonomous driving case, where the vehicle should be able to proceed its mission even in case of a single failure. The priority between the redundant systems may be fixed, the first two redundant control circuits by the rEPM, and the third control circuit is provided by rEPBi. The switching between the redundant brake systems may be automated. In case of any malfunction the secondary or tertiary redundant brake system may be activated. For the manual actuation of the different brake systems, independent pedal position sensors may be installed for all the three circuits to ensure the electric circuit separation of the different brake circuits.

A brake system for a vehicle comprises:
 a first axle pressure modulator for service brake chambers associated with a first axle of the vehicle;
 a second axle pressure modulator for spring brake cylinders associated with a second axle of the vehicle, wherein the second axle pressure modulator is connected to the electronic brake control unit;
 an electronic brake control unit, wherein the electronic brake control unit is configured to issue a first electric control signal for controlling the first axle pressure modulator and a second electric control signal for controlling the second axle pressure modulator;
 a further electronic brake control unit, wherein the further electronic brake control unit is configured to issue a further first electric control signal for controlling the first axle pressure modulator and a further second electric control signal for controlling the second axle pressure modulator;
 an electronic parking brake controller, wherein the electronic parking brake controller is configured to issue a second pneumatic control signal for controlling the spring brake cylinders; and
 a pressure modulator unit, wherein the pressure control valve is configured to convert a pneumatic signal or an electric signal issued by the electronic parking brake controller into a first pneumatic control signal for controlling the first axle pressure modulator.

The vehicle may be a utility vehicle or commercial vehicle, for example a truck, bus or the like. The first axle may be a front axle and the second axle a rear axle of the vehicle. The service brake chambers and the spring brake cylinders may represent brake actuators of the brake system or the vehicle. According to an embodiment, the pressure modulators, the electronic brake control units and the electronic parking brake controller, also known as electronic parking brake module, may be common units as already used in vehicles. The two electronic brake control units may be of identical type. The electronic brake control units and the electronic parking brake controller may be redundantly used to activate the service brake chambers and the spring brake cylinders in case of a service brake demand. The service brake demand may be different to a park brake demand being used to activate the brakes while the vehicle is in or close to a parking position. The service brake demand may be triggered by a driver of the vehicle or by an electronic control unit for an automated driving mode. Due to the pressure modulator unit, the electronic parking brake controller may be used to activate the service brake chambers associated with the first axle additionally to the spring brake cylinders associated with the second axle in case of a service brake demand. Thus, a redundant brake system can be realized. The pneumatic signal issued by the electronic parking brake controller to the pressure modulator unit may be the second pneumatic control signal or a further pneumatic control signal.

The electronic brake control unit may be part of a first control circuit, the further electronic brake control unit may be part of a second control circuit and the electronic parking brake controller may be part of a third control circuit. The first control circuit may be configured to provide a primary service brake functionality. If the brake system is intact, the electronic brake control may be used to activate the service brake chambers and the spring brake cylinders in case of a service brake demand. In the event of a malfunction of the first control circuit the second control circuit and/or the third second control circuit are configured to provide redundant service brake functionalities. In the event of a malfunction of the first control circuit the further electronic brake control unit or the electronic parking brake controller may be used to activate the service brake chambers and the spring brake cylinders in case of a service brake demand. Thus, one of the second and third control circuits may be selected to replace the first control circuit in case of a malfunction of the first control circuit in order to execute a service brake demand.

The brake system may comprise a first electric power supply unit, which may be connected to the electronic brake control unit. The first electric power supply may be configured to provide electric power necessary to run the electronic brake control unit.

The brake system may comprise a second power supply unit, which may be connected to the further electronic brake control unit. The second electric power supply may be configured to provide electric power necessary to run the further electronic brake control unit. The brake system may comprise a third power supply unit, which may be connected to the electronic brake control unit. The third electric power supply may be configured to provide electric power necessary to run the electronic brake control unit. Thus there may be three independent electric power supplies.

The brake system may comprise a first switch being configured to select the first electric control signal or the further first electric control signal for controlling the first axle pressure modulator. The first switch may provide a switching functionality for switching between the first control circuit and the second control circuit with regard to the service brake chambers.

The brake system may comprise a second switch being configured to select the second electric control signal or the further second electric control signal for controlling the second axle pressure modulator. The first switch may provide a switching functionality for switching between the first control circuit and the second control circuit with regard to the service brake chambers.

The brake system may have an interface to sensors associated with the axels and/or wheels of the vehicle. The interface may be configured to provide sensor signals of the sensors to the first control circuit, the second control circuit and the third control circuit. The brake system may comprise at least one unit for branching the sensor signals received via the interface to the electronic brake control units and the electronic parking brake controller.

According to an embodiment, the electronic parking brake controller and/or the pressure modulator unit is configured to receive at least one first sensor signal via an interface to at least one first sensor associated with the first axle. The at least sensor signal can be used to optimize an activation of the service brake chambers during a service brake demand carried out by the electronic parking brake controller.

The pressure modulator unit may be an inverting relay valve. Such a valve is cost-efficient and reliable. The inverting relay valve may be used to convert the pneumatic signal, in particular the second pneumatic control signal, issued by the electronic parking brake controller.

According to an alternative embodiment, the pressure modulator unit may be an electrically controlled pressure modulator. In this case, the electronic parking brake controller may issue an electric signal for controlling the first axle pressure modulator via the pressure modulator unit. The electric signal may be issued by the electronic parking brake controller additionally to the second pneumatic control signal.

The brake system may comprise a trailer control module for controlling braking functions of a trailer of the vehicle. The electronic brake control unit may be configured to issue a third electric control signal for controlling the trailer control module. The further electronic brake control unit may be configured to issue a further third electric control signal for controlling the trailer control module. The electronic parking brake controller may be configured to issue a third pneumatic control signal for controlling the trailer control module. The trailer control module may be common unit as already used in vehicles. If the brake system is intact, the electronic brake control may be used to control the trailer control module. In the event of a malfunction of the first control circuit the further electronic brake control or the electronic parking brake controller may be used to control the trailer control module. Thus, one of the second and third control circuits may be selected to replace the first control circuit in case of a malfunction of the first control circuit with regard to an activation of the brakes of a trailer.

The brake system may comprise an human-machine interface being configured to issue at least one human-machine control signal for controlling the electronic brake control unit, the further electronic brake control unit and the electronic parking brake controller. The human-machine interface may be a foot brake sensor or a lever. The human-machine interface may be operated by a driver of the vehicle in order to slow down the vehicle. Even if both electronic brake control units are out of order, the brakes of the vehicle can still be activated by the electronic parking brake controller in order to slow down the vehicle.

The brake system may comprise may comprise a control unit interface for connecting the electronic brake control unit, the further electronic brake control unit and the electronic parking brake controller to an electronic control unit. Thus, the brakes of the vehicle can be activated in response to a service brake demand issued by the electronic control unit, even if both electronic brake control units are out of order.

The electronic brake control unit, the further electronic brake control unit and the electronic parking brake controller are pairwise interlinked with each other. This allows exchanging information between the control circuits, for example information concerning a malfunction detected in one of the control circuits.

The brake system may comprise a left pressure control valve and a right pressure control valve. The left pressure control valve may be configured to control a pressure of a left pneumatic pressure signal provided by the first axle pressure modulator for activating a left service brake chamber associated with a left wheel of the first axle of the vehicle. The right pressure control valve may be configured to control a pressure of a right pneumatic pressure signal provided by the first axle pressure modulator for activating a right service brake chamber associated with a right wheel of the first axle of the vehicle.

Thus the pressure provided to the left and the right service brake chambers may be adjusted individually. The electronic brake control unit may be configured to issue a left electric control signal for controlling the left pressure control valve and a right electric control signal for controlling the right pressure control valve. Thus a redundant steering system can be realized. The autonomous driving has special demand against the steering system of an autonomous vehicle also. The intact steering system must be supplied with a redundant steering system, which requirement can be fulfilled by a special function of the brake system, namely the steer by braking.

Further, the brake system may comprise a further left pressure control valve and a further right pressure control valve. The further left pressure control valve may be configured to further control a further pressure of a left pneumatic pressure signal provided by the first axle pressure modulator for activating the left service brake chamber associated with the left wheel of the first axle of the vehicle. The further right pressure control valve may be configured to further control a pressure of the right pneumatic pressure signal provided by the first axle pressure modulator for activating the right service brake chamber associated with the right wheel of the first axle of the vehicle. The further electronic brake control unit may be configured to issue a further left electric control signal for controlling the further left pressure control valve and a further right electric control signal for controlling the further right pressure control valve. Thus the two electronic brake control units provide a redundant steering functionality additionally to a redundant brake functionality.

The brake system or the vehicle may comprise a steering gear unit. The steering gear unit and the electronic brake control units may be connected to different electric power supply units.

A vehicle comprises:
  a first axle and a second axle;
  service brake chambers associated with the first axle;
  spring brake cylinders associated with the second axle; and
  an embodiment of the aforementioned brake system.

The brake system may be used instead of a common brake system used for vehicles.

A method of controlling a brake system for a vehicle, wherein the brake system is an embodiment of the aforementioned, comprises the following steps:
  receiving an error signal representing a malfunction of the a first control circuit comprising the electronic brake control; and
  transmitting a service brake demand signal to further electronic brake control unit or the electronic parking brake controller responsive to the error signal.

The method or the steps of the method may be executed using a controller. Thus, the method may be executed to control an embodiment of the aforementioned brake system.

Embodiments of the approach presented here shall be explained in greater detail in the subsequent description with reference to the figures.

DETAILED DESCRIPTION

In the following description of advantageous embodiments of the present invention, the 30 same or similar reference numerals shall be used for the elements depicted in the various figures and acting in a similar way, wherein repeated description of these elements shall be omitted.

Figure 1:
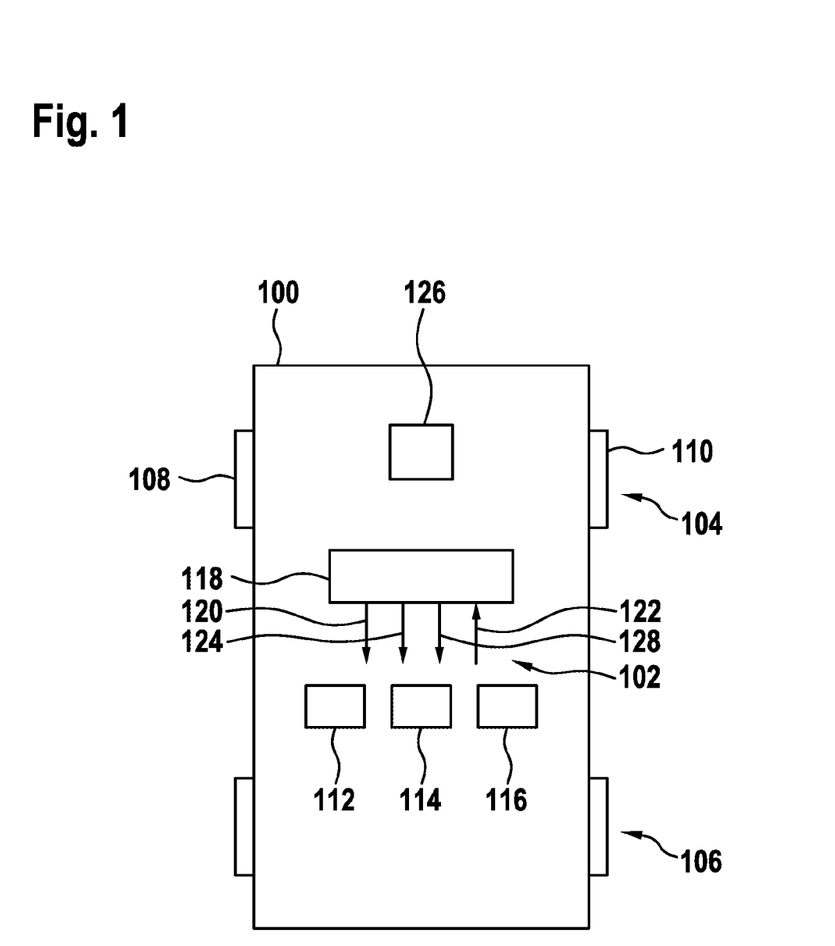
FIG. 1 shows a schematic illustration of a vehicle comprising a brake system according to an embodiment of the present invention.

FIG. 1 shows a schematic illustration of a vehicle 100 comprising a brake system 102 according to an embodiment of the present invention. The vehicle 100 is a utility vehicle or commercial vehicle, such as a truck. The vehicle 100 comprises a first axle 104, in particular a front axle, and at least one second axle 106, in particular a rear axle, according to this embodiment. The first axle 104 comprises a left wheel 108 and a right wheel 110.

The brake system 102 comprises a first control circuit 112, a second control circuit 114 and a third control circuit 116. In case the first control circuit 112 is intact, the first control circuit 112 is used to activate the brakes of the vehicle 100 in response to a service brake demand. In case of a malfunction of the first control circuit 112, the second control circuit 114 or the third control circuit 116 are used to activate the brakes of the vehicle in response to the service brake demand instead of the first control circuit 112. According to an embodiment, in case of a malfunction of the first control circuit 112, the second control circuit 114 is activated an in case of a further malfunction of the second control circuit 114, the third control circuit 116 is used to activate the brakes of the vehicle in response to the service brake demand.

According to an embodiment, the vehicle 100 comprises an electronic control unit 118 (ECU) for controlling speed and optionally driving direction of the vehicle 100. The electronic control unit 118 may be connected to the control circuits 112, 114, 116 via a control unit interface, like a CAN-bus. In order to reduce the speed of the vehicle 100, the electronic control unit 118 is configured to provide a service brake demand signal 120. According to an embodiment the electronic control unit 118 is configured to provide the service brake demand signal 120 to the first control circuit 112. According to an embodiment the electronic control unit 118 is configured to provide the service brake demand signal 120 to the second control circuit 114 or the third control circuit 116, when an error signal 122 indicates a malfunction of the first control circuit 112. According to an embodiment the electronic control unit 118 is configured to provide a switch signal 124, when the error signal 122 indicates a malfunction of the first control circuit 112, wherein the switch signal 124 is configured to switch from the first control circuit 112 to the second control circuit 114. For example, the switch signal 124 is provided to a control input of a switch for switching between electric control signals provides by the first control circuit 112 and the second control circuit 114. The control unit 118 may be part of the brake system 102. According to an embodiment, the electronic control unit 118 is configured to provide the service brake demand while the vehicle is in a full or partial autonomous operation mode. In this case the control circuits 112, 114, 116 can be automatically operated without an interaction of a driver of the vehicle.

According to an embodiment the brake system 102 comprises a monitoring unit for monitoring a state of health of the brake system 102 and in particular of the first control circuit 112. The monitoring unit is configured to provide the error signal 122.

According to an embodiment, the vehicle 100 comprises a steering gear unit 126 for steering the vehicle 100, for example by controlling a steering box assembly of the vehicle 100. According to an embodiment, the electronic control unit 118 is configured to control the steering gear unit 126 in order to control the driving direction of the vehicle 100. In case of a malfunction of the steering gear unit 126, the electronic control unit 118 is configured to provide a steering demand, for example a steering signal 128. According to an embodiment the steering signal 128 is used by one of the circuits 112, 114, 116 to control the driving direction by activating the brakes of the vehicle 100. According to an embodiment, the steering signal 128 is used by the first control circuit 112 to control the driving and is used by the second control circuit 114 to control the driving direction in case of a malfunction of the first control circuit 112.

Figure 2:
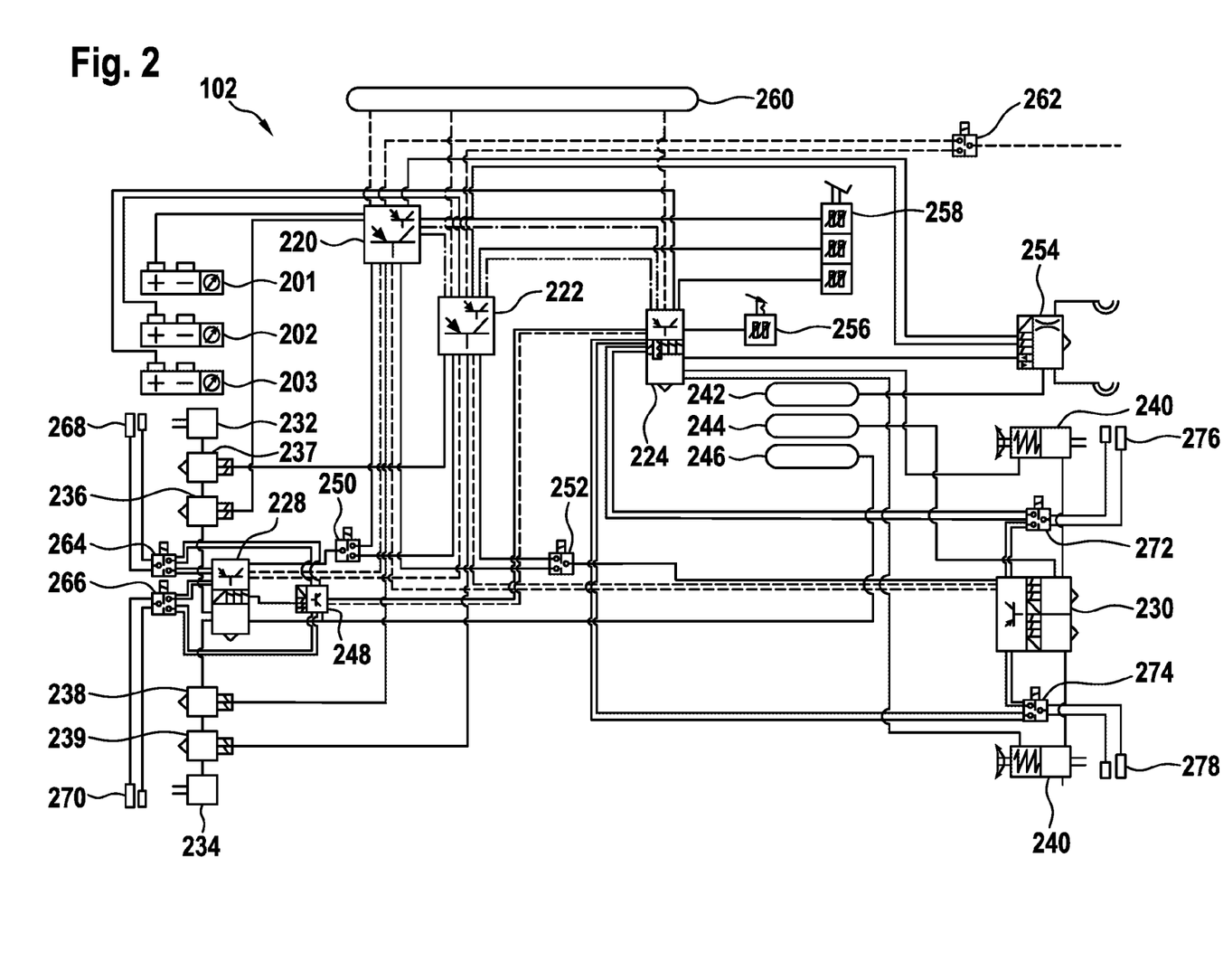
FIG. 2 shows a schematic illustration of a brake system according to an embodiment of 20 the present invention.

FIG. 2 shows a schematic illustration of a brake system 102 according to an embodiment of the present invention. The brake system 102 corresponds or is similar to the brake system shown in FIG. 1.

The brake system 102 according to this embodiment comprises a first electric power supply unit 201, a second electric power supply unit 202, and a third electric power supply unit 203. The brake system 102 further comprises an electronic brake control unit 220, a further electronic brake control unit 222 and an electronic parking brake controller 224, a first axle pressure modulator 228, a second axle pressure modulator 230, a left service brake chamber 232, a right service brake chamber 234, a left pressure control valve 236, a further left pressure control valve 237, a right pressure control valve 238, a further right pressure control valve 239 and two spring brake cylinders 240.

According to an embodiment, the brake system 110 further comprises a first compressed air supply module 242, a second compressed air supply module 244 and a third compressed air supply module 246.

According to an embodiment, the brake system 110 further comprises a pressure modulator unit 248, a first switch 250 and a second switch 252.

According to an embodiment, the brake system 110 optionally comprises a trailer control module 254. The trailer control module 254 is configured to control braking functions of a trailer coupled to the vehicle. The trailer control module 254 is connected to the first compressed air supply module 242.

According to an embodiment, the first electric power supply unit 201 and the electronic brake control unit 220 form part of the first control circuit, the second electric power supply unit 202 and the further electronic brake control unit 222 form part of the second control circuit and the third electric power supply unit 203 and the electronic parking brake controller 224 form part of the third control circuit described with reference to FIG. 1.

The first electric power supply unit 201 is electrically connected to the electronic brake control unit 220 via an analogous electric supply line. The second electric power supply unit 202 is electrically connected to the further electronic brake control unit 222 via a further analogous electric supply line. The third electric power supply unit 203 is electrically connected to the electronic parking brake controller 224 via a further analogous electric supply line.

The electronic brake control unit 220 is electrically connected to the first axle pressure modulator 228 via a digital electric signal line and connected to the first switch 250 via an analogous electric signal or supply line. Furthermore, the electronic brake control unit 220 is electrically connected to the second axle pressure modulator 230 via a digital electric signal line and to the second switch 252 via an analogous electric signal or supply line. The electronic brake control unit 220 is configured to issue a first electric control signal for controlling the first axle pressure modulator 228 via the first switch 250 and a second electric control signal for controlling the second axle pressure modulator 230 via the second switch 252. According to an embodiment, the electronic brake control unit 220 is electrically connected to the trailer control module 228 via an analogous electric signal or supply line and to the electronic brake control unit 222 and the electronic parking brake controller 224 via digital electric signal lines.

Optionally the electronic brake control unit 220 is electrically connected to the left pressure control valve 236 and the right pressure control valve 238 via two separate analogous electric signal or supply lines. According to an embodiment, the electronic brake control unit 220 is configured to issue a left electric control signal for controlling the left pressure control valve 236 and a right electric control signal for controlling the right pressure control valve 238. Thus the electronic brake control unit 220 can be used to control the driving direction of the vehicle additionally to or instead of a steering gear unit of the vehicle. According to an embodiment, the steering gear unit and the electronic brake control unit 220 are connected to different electric power supply units 201, 202, 203.

The further electronic brake control unit 222 is electrically connected to the first axle pressure modulator 228 via a digital electric signal line and connected to the first switch 250 via an analogous electric signal or supply line. Furthermore, the further electronic brake control unit 222 is electrically connected to the second axle pressure modulator 230 via a digital electric signal line and to the second switch 252 via an analogous electric signal or supply line. The further electronic brake control unit 222 is configured to issue a further first electric control signal for controlling the first axle pressure modulator 228 via the first switch 250 and a further second electric control signal for controlling the second axle pressure modulator 230 via the second switch 252. According to an embodiment, the further electronic brake control unit 220 is electrically connected to the trailer control module 228 via an analogous electric signal or supply line and to the electronic brake control unit 220 and to the electronic parking brake controller 224 via digital electric signal lines.

Optionally the further electronic brake control unit 222 is electrically connected to the further left pressure control valve 237 and to the further right pressure control valve 239 via two separate analogous electric signal or supply lines. According to an embodiment, the further electronic brake control unit 222 is configured to issue a further left electric control signal for controlling the further left pressure control valve 237 and a further right electric control signal for controlling the further right pressure control valve 239. Thus the further electronic brake control unit 222 can be used to control the driving direction of the vehicle additionally to or instead of the steering gear unit of the vehicle. According to an embodiment, the steering gear unit and the further electronic brake control unit 222 are connected to different electric power supply units 201, 202, 203.

The first switch 250 comprises a first input, a second input and an output. The electronic brake control unit 220 is configured to issue the first electric control signal to the first input and the further electronic brake control unit 222 is configured to issue the further first electric control signal to the second input of the first switch 250. The output of the first switch 250 is connected to the first axle pressure modulator 228 via a common switched analogous electric signal or supply line. The first switch 250 is configured to select the first electric control signal or the further first electric control signal for controlling the first axle pressure modulator 228, for example responsive to a switch signal.

The second switch 252 comprises a first input, a second input and an output. The electronic brake control unit 220 is configured to issue the second electric control signal to the first input and the further electronic brake control unit 222 is configured to issue the further second electric control signal to the second input of the second switch 252. The output of the second switch 252 is connected to the second axle pressure modulator 230 via a common switched analogous electric signal or supply line. The second switch 252 is configured to select the second electric control signal or the further second electric control signal for controlling the second axle pressure modulator 230, for example responsive to the switch signal.

The first axle pressure modulator 228, the service brake chambers 232, 234 and the pressure control valves 236, 237, 238, 239 are associated with a first axle of the vehicle. The first axle pressure modulator 228 is fluidically connected to the third compressed air supply module 246 via a pneumatic supply line. Further the third compressed air supply module 246 is connected to the pressure modulator unit 248 via a pneumatic supply line The first axle pressure modulator 228 is fluidically connected to the left pressure control valve 236 via a pneumatic control line and to the right pressure control valve 238 via a further pneumatic control line. The left pressure control valve 236 is fluidically connected to the further left pressure control valve 237 via a pneumatic control line and the right pressure control valve 238 is fluidically connected to the further right pressure control valve 239 via a further pneumatic control line. The further left pressure control valve 237 is fluidically connected to the left service brake chamber 232 via a pneumatic control line and the further right pressure control valve 239 is fluidically connected to the right service brake chamber 234 via a further pneumatic control line.

The second axle pressure modulator 230 and the spring brake cylinders 240 are associated with a second axle of the vehicle. The second axle pressure modulator 230 is fluidically connected to the second compressed air supply module 244 via a pneumatic supply line.

Furthermore, the second axle pressure modulator 230 is fluidically connected to the spring brake cylinders 240 via pneumatic service brake control lines.

The electronic parking brake controller 224 is electrically connected to the pressure modulator unit 248 via an analogous electric signal or supply line and a digital electrical signal line. According to an alternative embodiment, the electronic parking brake controller 224 is fluidically connected to the pressure modulator unit 248 via a pneumatic control line. The electronic parking brake controller 224 is fluidically connected to the spring brake cylinders 240 via a pneumatic control line. The electronic parking brake controller 224 is configured to issue a second pneumatic control signal for controlling the spring brake cylinders 240. Further, the electronic parking brake controller 224 is fluidically connected to the trailer control module 254 via a pneumatic brake control line.

The pressure modulator unit 248 is connected to the first axle pressure modulator 228 via a pneumatic control line. For controlling the first axle pressure modulator 228, the electronic parking brake controller 224 is configured to issue an electric signal to the pressure modulator unit 248. The pressure modulator unit 248 is configured to convert the electric signal issued by the electronic parking brake controller 224 into a first pneumatic control signal for controlling the first axle pressure modulator 228.

In case the brake system 102 comprises the trailer control module 254, the electronic brake control unit 220 is configured to issue a third electric control signal for controlling the trailer control module 254, the further electronic brake control unit 222 is configured to issue a further third electric control signal for controlling the trailer control module 254, and the electronic parking brake controller 224 is configured to issue a third pneumatic control signal for controlling the trailer control module 254.

Optionally, the electronic parking brake controller 224 is electrically connected to a park brake lever sensor 256 via an analogous electric signal or supply line. The park brake lever sensor 256 can be operated by a driver of the vehicle in order to issue a park brake demand. Thus, the electronic parking brake controller 224 can be used to provide a park brake functionality and a service brake functionality.

According to an embodiment, the brake system comprises a foot brake sensor 258. The foot brake sensor 258 is an human-machine interface which allows the driver to issue a service brake demand. The foot brake sensor 258 is connected to the electronic brake control unit 220 via a first analogous electric signal or supply line, to the further electronic brake control unit 222 via a second analogous electric signal or supply line, and to the electronic parking brake controller 224 via a third analogous electric signal or supply line. When operated by the driver, the foot brake sensor 258 is configured to issue a first human-machine control signal for controlling the electronic brake control unit 220, a second human-machine control signal for controlling the further electronic brake control unit 222 and a third human-machine control signal for controlling the electronic parking brake controller 224.

According to an embodiment, the brake system comprises a control unit interface 260 for connecting the electronic brake control unit 220, the further electronic brake control unit 222 and the electronic parking brake controller 224 to an electronic control unit. Thus the electronic brake control unit 220, the further electronic brake control unit 222 and the electronic parking brake controller 224 can be operated via the control unit interface 260 by an electronic control unit, for example during an automated driving mode, and additionally or alternatively by the foot brake sensor 258.

According to an embodiment the brake system 102 comprises a communication line selector 262. The electronic brake control unit 220 and the further electronic brake control unit 222 are connected via two separate digital electric signal lines to inputs of the communication line selector 262. An output of the communication line selector 262 is connected to a common electric signal line, for example to provide a signal according to ISO11992.

According to an embodiment, the brake system 102 comprises a first sensor switch 264 and a second sensor switch 266.

An input of the first sensor switch 264 is electrically connected to at least one first wheel sensor 268 associated to a left wheel of the first axle of the vehicle via an analogous electric signal or supply line. According to an embodiment, the first sensor switch 264 is configured to supply a first sensor signal issued by the first wheel sensor 268 to the first, second and third control circuit. According to an embodiment, a first output of the first sensor switch 264 is connected to the first axle pressure modulator 228 via at least one analogous electric line. The first axle pressure modulator 228 can be configured to use the first sensor signal forwarded by the first sensor switch 264 in order to control the pressure for activating the left service brake chamber 232 and/or to forward the first sensor signal to the electronic brake control unit 220 and the further electronic brake control unit 222. A second output of the first sensor switch 264 is connected to the pressure modulator unit 248 via at least one analogous electric line. The pressure modulator unit 248 can be configured to use the first sensor signal forwarded by the first sensor switch 264 in order to control the pressure provided to the first axle pressure modulator 228 and/or to forward the first sensor signal to the electronic parking brake controller 224.

An input of the second sensor switch 266 is electrically connected to at least one second wheel sensor 270 associated to a right wheel of the first axle of the vehicle via an analogous electric signal or supply line. According to an embodiment, the second sensor switch 266 is configured to supply a second sensor signal issued by the second wheel sensor 270 to the first, second and third control circuit. According to an embodiment, a first output of the second sensor switch 266 is connected to the first axle pressure modulator 228 via at least one analogous electric line. The first axle pressure modulator 228 can be configured to use the second sensor signal forwarded by the second sensor switch 266 in order to control the pressure for activating the right service brake chamber 234 and/or to forward the second sensor signal to the electronic brake control unit 220 and the further electronic brake control unit 222. A second output of the second sensor switch 266 is connected to the pressure modulator unit 248 via at least one analogous electric line. The pressure modulator unit 248 can be configured to use the second sensor signal forwarded by the second sensor switch 266 in order to control the pressure provided to the first axle pressure modulator 228 and/or to forward the second sensor signal to the electronic parking brake controller 224.

According to an embodiment, the brake system 102 comprises a third sensor switch 272 and a fourth sensor switch 274.

An input of the third sensor switch 272 is electrically connected to at least one third wheel sensor 276 associated to a left wheel of the second axle of the vehicle via an analogous electric signal or supply line. According to an embodiment, the third sensor switch 272 is configured to supply a third sensor signal issued by the third wheel sensor 276 to the first, second and third control circuit. According to an embodiment, a first output of the third sensor switch 272 is connected to the second axle pressure modulator 230 via at least one analogous electric line. The second axle pressure modulator 230 can be configured to use the third sensor signal forwarded by the third sensor switch 272 in order to control the pressure for activating the left spring brake cylinder 240 and/or to forward the third sensor signal to the electronic brake control unit 220 and the further electronic brake control unit 222. A second output of the third sensor switch 272 is connected to the electronic parking brake controller 224 via at least one analogous electric line.

An input of the fourth sensor switch 274 is electrically connected to at least one fourth wheel sensor 278 associated to a right wheel of the second axle of the vehicle via an analogous electric signal or supply line. According to an embodiment, the fourth sensor switch 274 is configured to supply a fourth sensor signal issued by the fourth wheel sensor 278 to the first, second and third control circuit. According to an embodiment, a first output of the fourth sensor switch 274 is connected to the second axle pressure modulator 230 via at least one analogous electric line. The second axle pressure modulator 230 can be configured to use the fourth sensor signal forwarded by the fourth sensor switch 274 in order to control the pressure for activating the right spring brake cylinder 240 and/or to forward the fourth sensor signal to the electronic brake control unit 220 and the further electronic brake control unit 222. A second output of the fourth sensor switch 274 is connected to the electronic parking brake controller 224 via at least one analogous electric line.

According to the embodiment shown in FIG. 2 there is a group of sensors 268, 270, 276, 278 connected to each of the sensor switches 264, 266, 272, 274. Thus each sensor switch 264, 266, 272, 274 is configured to forward a plurality of sensor signals.

According to an embodiment, FIG. 2 shows a schematic of a redundant commercial vehicle electronic brake system 102 or electro-pneumatic brake system 102. The main components of the brake system 102 are described in the following. In the following the first axle represents a front axle and the second axle represents a rear axle, thus "first" can be used as a synonym for "front" and "second" can be used as a synonym for "rear".

The priority between the redundant systems is fixed, the first two redundant control circuits by the electronic brake control units 220, 222 and the third control circuit is provided by the electronic parking brake controller 224. The switching between the redundant brake systems is automated. In case of any malfunction the secondary or tertiary redundant brake system is activated. For the manual actuation of the different brake systems, independent pedal position sensors, like sensors included in the foot brake sensor 258 are installed for all the three circuits to ensure the electric circuit separation of the different brake circuits.

According to an embodiment of the brake system architecture, the brake system 102 is redundantly supplied by the power supply units 201, 202, 203 which are realized as separate batteries or power supplies or power sources. The EBS electronic brake control unit 220 is supplied from the first power supply unit 201. The electronic brake control unit 220 is electronically controlling the front axle pressure modulator 228, the pressure control valves 236, 238 on the front axle, the rear axle pressure modulator 230 and the trailer control module 254. The front axle wheel brakes are actuated by the service brake chambers 232, 234, while on the rear axle by spring brake cylinders 240 which are also known as spring brake combi cylinders.

One of the redundant pair of the brake system 102 is provided by another EBS ECU, in particular the further electronic brake control unit 222, which is actuating the front axle pressure modulator 228 and the rear axle pressure modulator 230, for example via a second CAN channel. Moreover the further electronic brake control unit 222 provides an electric control signal to the trailer control module 254. There are power supply switches 250, 252 installed, to ensure the power supply of the axle modulators 248, 250 from the two different power supply units 201, 202. There is a communication line selector 262 installed for the trailer communication, which ensures the communication between active electronic brake control unit 220, 222 and the trailer.

There is a redundant pair of pressure control valves 236, 238, 237, 239 installed on the front axle to be able to use the steer-by-brake function with the redundant system of electronic brake control units. The possibility of the sidewise braking of the front axle ensures the vehicle stability e.g. on mu-split road surface during emergency braking. The signals of the wheel speed sensors 268, 270, 276, 278 can be routed by the electric communication line switches 264, 266, 272, 274 between the ECUs of the electronic brake control units 220, 222 and the electronic parking brake controller 224, which is necessary to perform ABS braking by the redundant EBS system 102 with any of the three control circuits.

The other main redundant brake architecture part is the electronic parking brake, comprising the electronic parking brake controller 224, which provides the third control circuit. In case of malfunction of the electronics of the electronic brake control units 220, 222 or theirs power supply units 201, 202 the brake control can be taken over by the EPB module, comprising the electronic parking brake controller 224, and the axles equipped by spring brake chambers 240 are actuated by the parking brake control, while other axles without spring brake chamber 240 are controlled pneumatically through the pressure modulator unit 248 and the first axle pressure modulator 228. The pressure modulator unit 248 can be an electrically controlled unit to the electronic parking brake controller, but in another realization in can be a pneumatic valve with an inverting relay function, which is using the output of the electronic parking brake controller 224 to control the axles without spring brakes 240, here the axles with service brake chambers 232. In case the electronic parking brake controller 224 or its power supply unit 203 has any malfunction the electronic brake control unit 220 is controlling the service brake system as in normal case. The parking brake modulation can be also temporally simulated in such a case by the service brake actuation.

The foot brake sensor 258 provides three independent demand signals for the three different brake control circuits. The electronic control unit of each brake control circuit is able to receive external brake demand via an external communication line, like the control unit interface, from higher level vehicle systems, for example from an autonomous control logic, and all three electronic control units communicate with each other via internal communication line, for example for performing plausibility checks, etc.

The control of the trailer is solved by the communication line switch 262 between the trailer and the two electronic brake control units 220, 222. The trailer control module 254 is controlled by the two electronic brake control units 220, 222 electrically; the electronic parking brake controller 224 can control the trailer via the inverting pneumatic port of the trailer control module 254, which is the state of the art.

According to an embodiment, the brake system 102 further provides a redundant steering system.

For a steer by brake function, the primary and secondary circuits comprising the electronic brake control units 220, 222 can generate different pressures on each side on the front axle with the help of the pressure control valves 236, 237, 238, 239 based on a steering demand as a redundancy for a steering gear.

The pressure difference between the left and the right side on the front axle causes a brake force difference sidewise, which causes a yaw-moment. Since the primary and secondary circuits comprising the electronic brake control units 220, 222 are powered from the first electric power supply unit 201 and the second electric power supply unit 202, therefore the steering gear electronics should be supplied from the third electric power supply unit 203.

The steering gear electronics may correspond to the steering gear unit as shown in FIG. 1.

According to an embodiment, the brake system 102 of a commercial vehicle with an electro-pneumatic service brake system and an electro-pneumatic parking brake system, as shown in FIG. 2 comprises multiple redundancy, with control circuits more than two, in order that an automated vehicle can proceed its mission even in case of any single failure. The control circuits used for redundancy may be the second control circuit comprising the further electronic brake control unit 222 and the third control circuit comprising the electronic parking brake controller 224.

According to an embodiment, the brake control pressure of two brake control circuits are controlled by the electronic brake control units 220, 222 with axle modulator 228, 230 branching, and the third control circuit is controlled by the electronic parking brake system comprising the electronic parking brake controller 224.

The wheel sensors 168, 270, 276, 278 may comprise wheel-end sensors like wheel-speed sensors, wear sensors or any further sensor. According to an embodiment, the sensors 168, 270, 276, 278 are branched by an appropriate device, for example the switches 264, 266, 272, 274 for the brake control units comprising the electronic brake control units 220, 222 and the electronic parking brake controller 224.

According to an embodiment, all three brake control circuits can be manually commanded by a three-circuit human-machine interface 258. Additionally or alternatively all three redundant brake control circuits can be actuated electronically via three independent circuit external electric communication lines, like CANs, which is indicated in FIG. 2 by the control unit interface 260.

According to an embodiment, all redundant brake system controllers, here the electronic brake control units 220, 222 and the electronic parking brake controller 224 are pairwise interlinked with each other, for example to perform plausibility checks.

Figure 3:
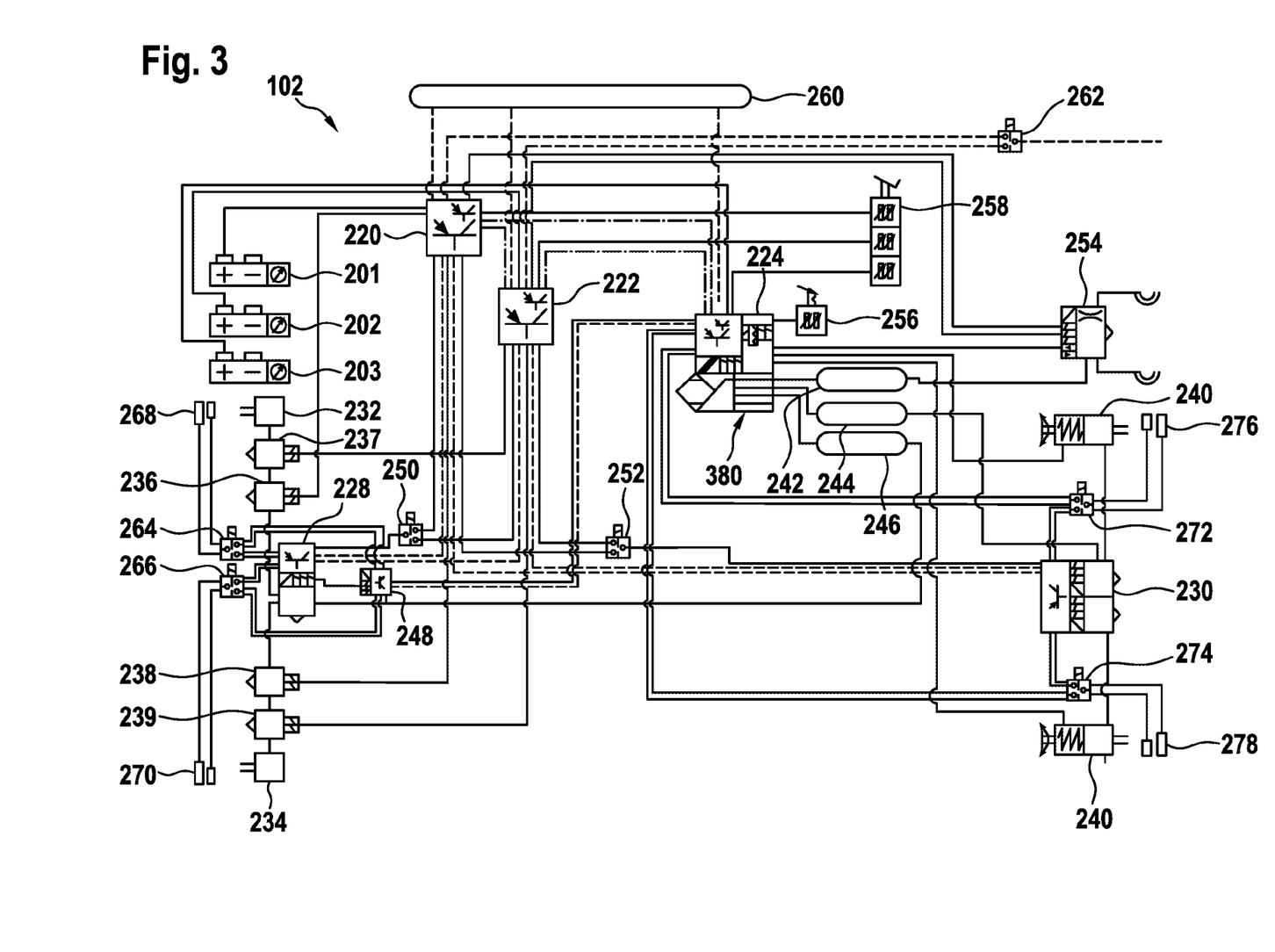
FIG. 3 shows a schematic illustration of a brake system according to an embodiment of the present invention.

FIG. 3 shows a schematic illustration of a brake system 102 according to an embodiment of the present invention. The brake system 102 corresponds or is similar to the brake system shown in FIG. 2 with the difference that the electronic parking brake controller 224 is integrated in an electronic air control (EAC) 380. Thus, in the further realization shown in FIG. 2, the electronic parking brake unit is integrated into an air supply unit. The electronic air control 380 is connected to the compressed air supply modules 242, 244, 246.

Figure 4:
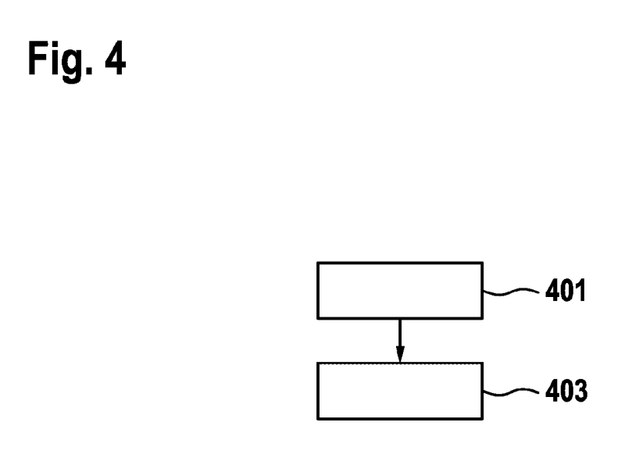
FIG. 4 shows a flowchart of a method of controlling a brake system according to an embodiment of the present invention.

FIG. 4 shows a flowchart of a method of controlling a brake system according to an embodiment of the present invention. The method 400 is executable in connection with a brake system as described with reference to one of the preceding figures or a similar brake system.

The method comprises a step 401 of receiving an error signal representing a malfunction of a first control circuit comprising the electronic brake control of the brake system and a step 403 of transmitting a service brake demand signal to the further electronic brake control unit or the electronic parking brake controller of the brake system responsive to the error signal.

The reference numeral list is as follows:
100 vehicle
102 brake system
104 first axle
106 second axle
108 left wheel
110 right wheel
112 first control circuit
114 second control circuit
116 third control circuit
118 control unit
120 service brake demand signal
122 error signal
124 switch signal
126 steering gear unit
128 steering signal
201 first electric power supply unit
202 second electric power supply unit
203 third electric power supply unit
220 electronic brake control unit
222 further electronic brake control unit
224 electronic parking brake controller
228 first axle pressure modulator
230 second axle pressure modulator
232 left service brake chamber
234 right service brake chamber
236 left pressure control valve
237 further left pressure control valve
238 right pressure control valve
239 further right pressure control valve
240 spring brake cylinders
242 first compressed air supply module
244 second compressed air supply module
246 third compressed air supply module
248 pressure modulator unit
250 first pneumatic selector valve
252 second pneumatic selector valve
254 trailer control module
256 park brake lever sensor
258 foot brake sensor
260 control unit interface
262 communication line selector
264 first switch
266 second switch
268 first wheel sensor
270 second wheel sensor
272 third switch
274 fourth switch
276 third wheel sensor
278 fourth wheel sensor
380 electronic air control
401 receiving an error signal
403 transmitting a service brake demand signal

The invention claimed is:

1. A brake system for a vehicle, comprising:
a first axle pressure modulator for service brake chambers associated with a first axle of the vehicle;
a second axle pressure modulator for spring brake cylinders associated with a second axle of the vehicle;
an electronic brake control unit, wherein the electronic brake control unit is configured to issue a first electric control signal for controlling the first axle pressure modulator and a second electric control signal for controlling the second axle pressure modulator;
a further electronic brake control unit configured to issue a further first electric control signal for controlling the first axle pressure modulator and a further second electric control signal for controlling the second axle pressure modulator;
an electronic parking brake controller configured to issue a second pneumatic control signal for controlling the spring brake cylinders; and
a pressure modulator configured to convert a pneumatic signal or an electric signal issued by the electronic parking brake controller into a first pneumatic control signal for controlling the first axle pressure modulator.

2. The brake system of claim 1, wherein the electronic brake control unit is part of a first control circuit, the further electronic brake control unit is part of a second control circuit and the electronic parking brake controller is part of a third control circuit, and wherein the first control circuit is configured to provide a primary service brake functionality, and the first control circuit the second control circuit and/or the third control circuit are configured to provide a redundant service brake functionality when there is a malfunction.

3. The brake system of claim 1, further comprising:
a first electric power supply unit connected to the electronic brake control unit;
a second electric power supply unit connected to further electronic brake control unit; and
a third electric power supply unit connected to the electronic brake control unit.

4. The brake system of claim 1, further comprising:
a first switch configured to select the first electric control signal or the further first electric control signal for controlling the first axle pressure modulator.

5. The brake system of claim 1, further comprising:
a second switch configured to select the second electric control signal or the further second electric control signal for controlling the second axle pressure modulator.

6. The brake system of claim 1, wherein the electronic parking brake controller and/or the pressure modulator unit is configured to receive at least one first sensor signal via an interface to at least one first sensor associated with the first axle.

7. The brake system of claim 1, wherein the pressure modulator unit is an inverting relay valve or an electrically controlled pressure modulator.

8. The brake system of claim 1, further comprising:
a trailer control module for controlling braking functions of a trailer of the vehicle, wherein the electronic brake control unit is configured to issue a third electric control signal for controlling the trailer control module, and wherein the further electronic brake control unit is configured to issue a further third electric control signal for controlling the trailer control module, and wherein the electronic parking brake controller is configured to issue a third pneumatic control signal for controlling the trailer control module.

9. The brake system of claim 1, further comprising:
a human-machine interface configured to issue at least one human-machine control signal for controlling the electronic brake control unit, the further electronic brake control unit and the electronic parking brake controller.

10. The brake system of claim 1, further comprising:
a control unit interface for connecting the electronic brake control unit, the further electronic brake control unit and the electronic parking brake controller to an electronic control unit.

11. The brake system of claim 1, wherein the electronic brake control unit, the further electronic brake control unit and the electronic parking brake controller are pairwise interlinked with each other.

12. The brake system of claim 1, further comprising:
a left pressure control valve and a right pressure control valve, wherein the left pressure control valve is configured to control a pressure of a left pneumatic pressure signal provided by the first axle pressure modulator for activating a left service brake chamber associated with a left wheel of the first axle of the vehicle, and wherein the right pressure control valve is configured to control a pressure of a right pneumatic pressure signal provided by the first axle pressure modulator for activating a right service brake chamber associated with a right wheel of the first axle of the vehicle and further comprising a further left pressure control valve and a further right pressure control valve, wherein the further left pressure control valve is configured to further control the pressure of the left pneumatic pressure signal provided by the first axle pressure modulator for activating a left service brake chamber associated with the left wheel of the first axle of the vehicle, and wherein the further right pressure control valve is configured to further control a pressure of the right pneumatic pressure signal provided by the first axle pressure modulator for activating the right service brake chamber associated with the right wheel of the first axle of the vehicle and wherein the electronic brake control unit is configured to issue a left electric control signal for controlling the left pressure control valve and a right electric control signal for controlling the right pressure control valve and wherein the further electronic brake control unit is configured to issue a further left electric control signal for controlling the further left pressure control valve and a further right electric control signal for controlling the further right pressure control valve.

13. A vehicle, comprising:
a first axle;
a second axle;
service brake chambers associated with the first axle;
spring brake cylinders associated with the second axle; and
a brake system, including:
  a first axle pressure modulator for the service brake chambers associated with the first axle of the vehicle;
  a second axle pressure modulator for the spring brake cylinders associated with the second axle of the vehicle;
  an electronic brake control unit configured to issue a first electric control signal for controlling the first axle pressure modulator and a second electric control signal for controlling the second axle pressure modulator;
  a further electronic brake control unit configured to issue a further first electric control signal for controlling the first axle pressure modulator and a further second electric control signal for controlling the second axle pressure modulator;
  an electronic parking brake controller configured to issue a second pneumatic control signal for controlling the spring brake cylinders; and
  a pressure modulator unit configured to convert a pneumatic signal or an electric signal issued by the electronic parking brake controller into a first pneumatic control signal for controlling the first axle pressure modulator.

14. The vehicle of claim 13, wherein the electronic brake control unit is part of a first control circuit, the further electronic brake control unit is part of a second control circuit and the electronic parking brake controller is part of a third control circuit, and wherein the first control circuit is configured to provide a primary service brake functionality, and the first control circuit the second control circuit and/or the third control circuit are configured to provide a redundant service brake functionality when there is a malfunction.

15. The vehicle of claim 13, further comprising:
a first electric power supply unit connected to the electronic brake control unit;
a second electric power supply unit connected to further electronic brake control unit; and
a third electric power supply unit connected to the electronic brake control unit.

16. The vehicle of claim 13, further comprising:
a first switch configured to select the first electric control signal or the further first electric control signal for controlling the first axle pressure modulator.

17. The vehicle of claim 13, further comprising:
a second switch configured to select the second electric control signal or the further second electric control signal for controlling the second axle pressure modulator.

18. The vehicle of claim 13, wherein the electronic parking brake controller and/or the pressure modulator unit is configured to receive at least one first sensor signal via an interface to at least one first sensor associated with the first axle.

19. The vehicle of claim 13, wherein the pressure modulator unit is an inverting relay valve or an electrically controlled pressure modulator.

20. The vehicle of claim 13, further comprising:
a trailer control module for controlling braking functions of a trailer of the vehicle, wherein the electronic brake control unit is configured to issue a third electric control signal for controlling the trailer control module, and wherein the further electronic brake control unit is configured to issue a further third electric control signal for controlling the trailer control module, and wherein the electronic parking brake controller is configured to issue a third pneumatic control signal for controlling the trailer control module.

21. The vehicle of claim 13, further comprising:
a human-machine interface configured to issue at least one human-machine control signal for controlling the electronic brake control unit, the further electronic brake control unit and the electronic parking brake controller.

22. The vehicle of claim 13, further comprising:
a control unit interface for connecting the electronic brake control unit, the further electronic brake control unit and the electronic parking brake controller to an electronic control unit.

23. The vehicle of claim 13, wherein the electronic brake control unit, the further electronic brake control unit and the electronic parking brake controller are pairwise interlinked with each other.

24. The vehicle of claim 13, further comprising:
a left pressure control valve and a right pressure control valve, wherein the left pressure control valve is configured to control a pressure of a left pneumatic pressure signal provided by the first axle pressure modulator for activating a left service brake chamber associated with a left wheel of the first axle of the vehicle, and wherein the right pressure control valve is configured to control a pressure of a right pneumatic pressure signal provided by the first axle pressure modulator for activating a right service brake chamber associated with a right wheel of the first axle of the vehicle and further comprising a further left pressure control valve and a further right pressure control valve, wherein the further left pressure control valve is configured to further control the pressure of the left pneumatic pressure signal provided by the first axle pressure modulator for activating a left service brake chamber associated with the left wheel of the first axle of the vehicle, and wherein the further right pressure control valve is configured to further control a pressure of the right pneumatic pressure signal provided by the first axle pressure modulator for activating the right service brake chamber associated with the right wheel of the first axle of the vehicle and wherein the electronic brake control unit is configured to issue a left electric control signal for controlling the left pressure control valve and a right electric control signal for controlling the right pressure control valve and wherein the further electronic brake control unit is configured to issue a further left electric control signal for controlling the further left pressure control valve and a further right electric control signal for controlling the further right pressure control valve.

25. A method of controlling a brake system for a vehicle, the method comprising:

receiving an error signal representing a malfunction of a first control circuit including an electronic brake control unit; and transmitting a service brake demand signal to a further electronic brake control unit or the electronic parking brake controller responsive to the error signal;

wherein the brake system includes:
- a first axle pressure modulator for service brake chambers associated with a first axle of the vehicle;
- a second axle pressure modulator for spring brake cylinders associated with a second axle of the vehicle;
- the electronic brake control unit configured to issue a first electric control signal for controlling the first axle pressure modulator and a second electric control signal for controlling the second axle pressure modulator;
- the further electronic brake control unit configured to issue a further first electric control signal for controlling the first axle pressure modulator and a further second electric control signal for controlling the second axle pressure modulator;
- the electronic parking brake controller configured to issue a second pneumatic control signal for controlling the spring brake cylinders; and
- a pressure modulator configured to convert a pneumatic signal or an electric signal issued by the electronic parking brake controller into a first pneumatic control signal for controlling the first axle pressure modulator.

* * * * *